United States Patent [19]
Rapp

[11] Patent Number: 4,800,175
[45] Date of Patent: Jan. 24, 1989

[54] PHOSPHOROUS PLANAR DOPANT SOURCE FOR LOW TEMPERATURE APPLICATIONS

[75] Inventor: James E. Rapp, Oregon, Ohio

[73] Assignee: Owens-Illinois Television Products Inc., Toledo, Ohio

[21] Appl. No.: 56,621

[22] Filed: May 29, 1987

[51] Int. Cl.$^4$ .................................... H01L 21/225
[52] U.S. Cl. ...................... 437/160; 437/168; 148/33; 501/4; 252/951
[58] Field of Search ............... 437/160, 180; 252/951; 501/4, 73, 10; 148/33

[56] References Cited

U.S. PATENT DOCUMENTS

| | | | |
|---|---|---|---|
| 3,841,927 | 10/1974 | Florence et al. | 437/168 |
| 3,920,882 | 11/1975 | Venkatu | 252/951 X |
| 3,998,668 | 12/1976 | Florence et al. | 252/951 X |
| 4,033,790 | 7/1977 | Gunjigake et al. | 437/168 X |
| 4,141,738 | 2/1979 | Rapp | 437/168 X |
| 4,175,988 | 11/1979 | Rapp | 437/168 |

*Primary Examiner*—Brian E. Hearn
*Assistant Examiner*—Tom Thomas

[57] ABSTRACT

A boron-containing heterocyclic compound prepared by reacting a primary amine of ammonia with an alkylene oxide or epoxide and then reacting concurrently or subsequently this reaction intermediate with a boric acid. This boron-containing heterocyclic compound may further be reacted with a metal metalloid or other metal compound and even further contain sulfur, such as a sulfide group.

18 Claims, No Drawings

PHOSPHOROUS PLANAR DOPANT SOURCE FOR LOW TEMPERATURE APPLICATIONS

The present invention relates to doping compositions for making dopant sources for doping by vapor phase transport of $P_2O_5$ silicon wafers. The invention also relates to methods of making the dopant sources and the doped silicon wafers that are used for low temperature applications.

Background of the Invention

In the past, phosphorus doping sources and doped silicon wafers have been prepared as disclosed in the Rapp U.S. Pat. No. 4,175,988, incorporated by reference for showing the background of the invention and for disclosing ceramic particles used in the doping compositions of the present invention. The prior art shows preparation of dopant sources and the doping of silicon wafers by vapor phase transport of $P_2O_5$ from the dopant sources to the silicon wafers.

In the art, there has been a need for strong doping sources (wafers) for the vapor phase transport of $P_2O_5$ from the sources to silicon wafers, doping wafers that fall apart during use being not acceptable.

There has been a need for doping wafers that evolve more phosphorus at low firing heat treating temperatures, say about 1050° C. or below.

There has been a need for phosphorus doping compositions and the doping source wafers prepared from the doping compositions, in which the doping wafers can be fired to evolve $P_2O_5$ therefrom and provide a relatively thick $P_2O_5$ containing a glassy film on the silicon wafer. Thus, there has been a need for a dopant source that will deposit a 200 to 2000 Angstrom thick film in a short vapor transport deposition time, such as 1 to 2 hours.

In the art, there has been a need for a solid dopant source such as a dopant wafer (made from a ceramic particle composition) that will deposit by vapor transport of $P_2O_5$ thicker glassy films on the silicon wafers, the thicker films helping to provide the dopant silicon wafer with a good uniform doping of phosphorus and with a desirable low sheet resistivity.

OBJECTS OF THE INVENTION

It is an object of the present invention to fill the needs of the prior art just described, the invention providing a doping composition and a dopant source wafer prepared therefrom, the resultant dopant source wafer effectively and easily forming a thick (200 to 2000 Angstroms) glassy film on the silicon wafer being doped by the vapor phase transport of $P_2O_5$ from the source wafer to the silicon wafer.

It is an object of the present invention to provide dopant source wafers, and the dopant source wafers themselves that will evolve $P_2O_5$ at a fast rate in vapor phase transport and deposition of $P_2O_5$ on the silicon wafer.

It is an object of the present invention to provide a dopant source wafer and silicon wafer dopant from the source wafer, the resultant silicon wafer being doped uniformly and having low sheet resistivity, the doped silicon wafer being used in low temperature (about 850° C. to 1050° C.) applications.

These and other objects will be apparent from thus specification that follows and the appended claims.

SUMMARY OF THE INVENTION

The present invention provides a doping composition for forming a dopant source wafer for doping by vapor phase transport of $P_2O_5$ a silicon wafer with phosphorus for low temperature applications, the composition comprising:

(a) finely divided particles of a polycrystalline ceramic having a average linear coefficient of thermal expansion of less than about $32 \times 10^{-7/°C.}$ from zero to 300° C. and consisting essentially of the following oxides in approximate mole percent:

| OXIDE | MOLE PERCENT |
| --- | --- |
| $P_2O_5$ | 45–75 |
| $Al_2O_3$ | 11–28 |
| $Ta_2O_5$ | 6.5–13 |
| $SiO_2$ | 0–20 |
| $La_2O_3$ | 0–7 | where $P_2O_5 + Al_2O_3 + Ta_2O_5$ is at least about 75 mole percent of the composition, (b) $Al_2O_3$, and (c) $H_3PO_4$ in an aqueous solution for reaction with $Al_2O_3$ to form a binder for the ceramic particles.

The present invention also provides a method of doping a silicon wafer comprising the steps of:

(A) forming a doping source wafer for doping a silicon wafer with phosphorus, the source wafer being formed from a composition comprising:

(a) 100 mesh or smaller particles of a polycrystalline ceramic having an average linear coefficient of thermal expansion of less than about $32 \times 10^{-7/°C.}$ from zero to 300° C. and consisting essentially of the following oxides in approximate mole percent:

| OXIDE | MOLE PERCENT |
| --- | --- |
| $P_2O_5$ | 45–75 |
| $Al_2O_3$ | 11–28 |
| $Ta_2O_5$ | 6.5–13 |
| $SiO_2$ | 0–20 |
| $La_2O_3$ | 0–7 | where $P_2O_5 + Al_2O_3 + Ta_2O_s$ is at least about 75 mole percent of the composition, (b) $Al_2O_3$, and (c) $H_3PO_4$ in an aqueous solution for reaction with $Al_2O_3$ to form a binder for the ceramic particles and, (B) firing the doping source wafers to form a glassy layer on the silicon wafer by the vapor phase transport of $P_2O_5$ to diffuse the phosphorus into the silicon wafer.

The ceramic particles are made according to U.S. Pat. No. 4,175,988 preferably contains $Ta_2O_5$, $Al_2O_3$, $P_2O_5$ and $SiO_2$. Example 87 of the patent is a preferred composition having the following ingredients in the approximate mole %:

| INGREDIENT | MOLE % |
| --- | --- |
| $P_2O_5$ | 61.6 |
| $Al_2O_3$ | 25.8 |
| $SiO_2$ | 2.6 |
| $Ta_2O_5$ | 10 |

The present invention thus provides a novel doping source wafer having a thickness like that of the silicon wafer of about 5 to 20 or 30 mils or more and preferably 8 to 12 mils.

The present invention provides a method of making a doping source wafer that has many advantages such as being strong and not easily broken. The source wafer is formed from the doping composition by casting and then careful drying the wafer so it is water resistant, and is resistant to cracking when removed from the mold. The drying generally involves a slow drying process depending on the thickness of the source wafer and the size of the wafer, whether a 3 inch, 4 inch, or 6 inch diameter wafer. Generally, the source wafer is dried at room temperature for about 1–16 hours. The source wafer is then heated at about 45° to 60° C. (preferably 50° to 55° C.) in an oven for 8 to 20 hours (preferably 11 to 16 hours). Next, the source wafer is heated in an oven at 60° to 80° C. (preferably 70° to 75° C.) for about 8 to 20 hours (preferably 10 to 15 hours). After drying the wafer sufficiently to be water resistant and easily removed from the mold, the wafer is removed and slotted. The wafer is rinsed and dried and is ready for surface etching by HF (diluted 10/1, for instance), the etching step cleaning and activating the surface.

The dried and slotted source wafer is then heat treated or fired to evolve $P_2O_5$ at about 1050° C. to 1150° C. (preferably 6 to 10 hours) to provide the doped silicon wafer that to used for low temperature applications.

The present invention also provides a doped silicon wafer, the glassy layer being removed if desired from the silicon wafer surface by known methods, preferably etching by HF.

The glassy layer on the silicon wafer is relatively thick, a layer of 350 to 1500 Angstroms at firing temperatures of 950° to 1050° C. being deposited in only about one hour. The resultant doped silicon wafer has a relatively low sheet resistivity, it being about 2.5 to 15 ohms/square for a one-hour deposition time using a firing temperature of about 950° C. to 1050° C.

DETAILS OF THE INVENTION

The polycrystalline ceramic particles are made as disclosed in the James E. Rapp U.S. Pat. Nos. 4,141,738 and 4,175,988, those patents being incorporated by reference herein.

The $Al_2O_3$ and phosphoric acid react to form the binder which is preferably about 20 to 60% of weight of the ceramic particles. Water is generally used in about 20 to 40% of the ceramic particles for the right dilution for handling and casting. Aluminum metaphosphate, used by itself, without the ceramic particles described above, does not provide all the surprising advantages of the present invention. Aluminum metaphosphate, alone, does not provide a high evolution rate, the high evolution rate of the dopant source wafer material of the present invention being an unexpected result.

EXAMPLE

Phosphorus doped silicon wafers were prepared with thicker glassy films and low sheet resistivities according to the following seven step process:

(1) Preparation of Polycrystalline Ceramic (Composition of Example 87 of U.S. Pat. No. 4,141,738) Powder The sources that were tested were made by ball milling 3" diameter rejected heat treated polycrystalline ceramic (U.S. Pat. No. 4,141,738) sources. When the material is ball milled for about one half hour, approximately 95% of the powder will pass through a −100 mesh screen, which is the preferred particle size although 50 mesh could be used.

Rejected 4", 5" and 6" diameter sources have also been ball milled and screened to −100 mesh. It was observed that these materials did not react the same as the 3" diameter powder did. This indicates that higher percentage of surface area material from a 3" diameter wafer is preferred.

The unheated treated material (scrap billets) that was ball milled and blended with the binder also did not react exactly the same as the powder from the 3" diameter sources. In addition, these wafers did not dope the silicon as well because of a lower $P_2O_5$ evolution rate.

(2) Blend Powder With Binder

The −100 mesh powder is blended with $Al_2O_3$ and phosphoric acid. Some water is also added to make the material fluid enough to pour into a mold. The $Al_2O_3$ and phosphoric acid chemically react to form te phosphate bond which eventually holds the powder grains together.

The following ratios were used:

| | |
|---|---|
| −100 Mesh Polycrystalline Powder (Example 87 of U.S. Pat. No. 4,141,738) | 17 Grams |
| $Al_2O_3$ | 2 Grams |
| 85% $H_3PO_4$ | 5 Grams |
| Distilled $H_2O$ | 6 Grams |
| | 30 Grams |

This is a sufficient amount of material to make one 3" diameter low temperature phosphorus source layer about 0.050" thick. The procedures for blending the materials are:

(a) Weigh the polycrystalline ceramic powder and $Al_2O_3$ and blend together.

(b) Weigh the distilled water and $H_3PO_4$ and $Al_2O_3$ will begin to evolve heat.

(c) Pour the mixture into the prepared mold (Step 3).

(3) Cast Source In Mold

The molds were made from a 5" diameter Teflon TM billet. Cavities that are 3.00" diameter and 4.00" diameter were cut 0.050" and 0.060" deep respectively into the surfaces of 1" long sections of the billets. Although the mixture does not stick to the molds when they are new, sticking does begin to occur after the molds have been used several times. Pam, a commercial cooking spray, was originally used as a mold release. Since this material probably contains a number of unwanted impurities, other materials were examined as a substitute. One satisfactory material found to date is commercially available Teflon spray.

The mixture is then poured into the center of the mold and is carefully spread to the edges of the mold by tapping the mold on the table. The casting is first allowed to dry for 20 on the table. The casting is first allowed to dry for 20 minutes at room temperature. It is then placed in a 90° C. oven for about 12 hours to complete the curing cycle. The temperature should not depart from these limits. If the temperature is too high (150° C.), bubbling may occur. If it is too low (50° C.), it is difficult to remove the wafer from the mold. The minimum curing time has not been determined, but can probably be shortened to about 8 to 10 hours.

(4) Fire Sources In Heat Treat Furnace

The cured sources are carefully removed from the Teflon molds and are placed on $Al_2O_3$ substrates. The sources can be stacked 6–12 sources high with $Al_2O_3$ substrates between them. They are then placed in the heat treatment furnace and heated to 1100° C. in about 2 hours.

After a 1-hour heat treatment at 1100° C., the sources are cooled back to room temperature.

(5) Inspection

The heat treated sources are easily lifted from the $Al_2O_3$ plates and inspected for cracks, lumps and very small pits. The lumps are usually caused by poor blending of the powder and binders. This sometime problem was corrected by increasing the water content of the solution from 5 grams to 6 grams.

Flashing along the edges also occurs periodically. It can be removed by using an $Al_2O_3$ grinding stone.

(6) Slotting

It has been determined by testing 2" and 3" diameter sources that at least 4 slots 90° apart are required to keep them from breaking during use. (The slotting pattern for 4" and 5" diameter sources has not been determined to date.) The slots are cut after heat treatment.

(7) Etching

The sources are etched in HF using procedures similar to preparation of doped silicon wafers. The concentration of the HF does not seem to be critical. The following etching cycles produced essentially the same results during doping tests:
(a) 10:1 5 Min.
(b) 5:1 5 Min.
(c) 3:1 5 Min.

After etching, the sources are rinsed in distilled water for 5 minutes and then dried at 150° C. for 60 minutes.

The low temperature phosphorus doping composition and resultant doped wafers have been designed for use at temperatures below 1050° C. The thicker (350 to 1500 Angstroms for a deposition time of one hour) glassy films that are deposited on the silicon wafers at low temperatures permit the process engineer to obtain high phosphorus concentrations in the silicon with short deposition times.

The resultant doped wafers can be used in typical emitter, in channel MOS and polysilicon diffusions without the hazards associated with toxic gases and liquids.

In the above example, the glassy film thickness and sheet resistivity at temperatures of 950° C. and 1050° C. are as follows:

|  | Glassy Film Thickness Angstroms | Sheet Resistivity Ohms/Square | Deposition Time Hrs. |
|---|---|---|---|
| 950° C. Temp | 400 | 12 | 1 |
|  | 500 | 8 | 2 |
| 1050° C. Temp | 1500 | 2.4 | 1 |
|  | 1800 | — | 2 |

The example illustrates the highly advantageous novel doping composition and novel dopant source wafers, the source wafers being capable of doping silicon wafers to provide the silicon wafers with low sheet resistivity and very good uniformity of doping.

The binder of the ceramic particles is generally made with a weight ratio of $Al_2O_3$ to $H_3PO_3$ of ¼ to 1/1 and preferably about ⅓ to ½ 1/2.5. The aluminum phosphate binders generally is made with a mole ratio of $P_2O_5$ to $Al_2O_3$ of about 1/1 to 4/1 and preferably about 1/1 to 1/1.5 or 1/1.6

In the present invention, it is believed that the h of evolution of the $P_2O_5$ from the source wafer is achieved as follows:

$$Al(PO_3)_3 \rightarrow AlPO_4 + P_2O_5$$

The finely divided $Al_2O_3$ (preferably less than 100 mesh such as 200, 300 or 400 mesh, and preferably the same fineness as the ceramic particles), for best results, is used with the aqueous $H_3PO_4$ in a mole ratio of $P_2O_5/Al_2O_3$ of about 1/1 to provide the aluminum meta phosphate as indicated on the left side of the above equation.

What is claimed is:

1. A doping composition for forming a dopant source wafer for doping by vapor phase transport of $P_2O_5$ a silicon wafer with phosphorus for low temperature applications, the compsoition consisting essentialy of:
   (a) finely divided particles of a polycrystalline ceramic having an average linear coefficient of thermal expansion of less than about $32 \times 10^{-7/°C.}$ from zero to 300° C. and
   consisting essentially of the following oxides in approximate mole percent;

| OXIDE | MOLE PERCENT |
|---|---|
| $P_2O_5$ | 45–75 |
| $Al_2O_3$ | 11–28 |
| $Ta_2O_5$ | 6.5–13 |
| $SiO_2$ | 0–20 |
| $La_2O_3$ | 0–7 | where $P_2O_5 + Al_2O_3 + Ta_2O_5$ is at least about 75 mole percent of the composition (b) finely divided particles of $Al_2O_3$, and
   (c) $H_3PO_4$ in an aqueous solution for reaction with $Al_2O_3$ to form a binder for the ceramic particles.

2. A method of doping a silicon wafer comprising the steps of:
(A) forming a doping source wafer for doping a silicon wafer with phorphorous, the source wafer being formed from composition comprising:
   (a) 100 mesh or smaller particles of a polycrystalline ceramic having an average linear coefficient of thermal expansion of less than about $32 \times 10^{-7/°C.}$ from zero to 300° C. and
   consisting essentially of the following oxides in approximately mole percent:

| OXIDE | MOLE PERCENT |
|---|---|
| $P_2O_5$ | 45–75 |
| $Al_2O_3$ | 11–28 |
| $Ta_2O_5$ | 6.5–13 |
| $SiO_2$ | 0–20 |
| $La_2O_3$ | 0–7 | where $P_2O_5 + Al_2O_3 + Ta_2O_5$ is at least about 75 mole percent of the composition, (b) about 100 mesh or smaller particles of $Al_2O_3$, and (c) $H_3PO_4$ in an aqueous solution for reaction with $Al_2O_3$ to form a binder for the ceramic particles, and (B) firing the doping source wafer to form a glassy layer on a silicon wafer by the vapor phase transport of $P_2O_5$ to diffuse phosphorus into the silicon wafer.

3. A method as defined in claim 2 in which there is a further step of drying the source wafer of step (A) sufficiently to be water resistant and resistant to breakage by handling.

4. A silicon wafer doped with phosphorus according to the method defined in claim 2.

5. A method as defined in claim 2 in which the doping wafer is formed in a flurocarbon polymer mold, the wafer is dried within the mold, and the wafer removed and heat treated.

6. A method as defined in claim 3 in which the drying step is at a temperature of about 60° C. to 140° C., and the firing step is at a temperature of about 1050° C. to 1150° C.

7. A method as defined in claim 3 in which there is a further step of slotting the wafers.

8. A method as defined in claim 7 in which the slotting is performed at least about 90° apart to help prevent breakage of the wafers.

9. A silicon wafer as defined in claim 4, the wafer being made with a relatively thick glassy layer and having low sheet resistivities.

10. A method as defined in claim 3 in which the glassy layer is about 200 to 2000 Angstroms in thickness.

11. A method as defined in claim 3 in which the sheet resistivity of the wafer is about 2.5 to 30 ohms per square for a deposition time of about one hour.

12. A method as defined in claim 2 in which the sheet resistivity of the doped silicon wafer is about 1.5 to 300 ohms/square.

13. A method as defined in claim 2 in which the sheet resistivity of the doped silicon wafer is about 2.5 to 75 ohms/square.

14. A doping source wafer made from the method defined in claim 2.

15. A composition as defined in claim 1 in which the following ingredients are used approximate parts by weight:

| INGREDIENTS | PARTS BY WEIGHT |
|---|---|
| (a) ceramic particles | 17 |
| (b) particles of $Al_2O_3$ | 2 |
| (c) 85 wt. % $H_3PO_4$ | 5 |
| and water | 6 |

16. A composition as defined in claim 1 in which the mole ratio of $P_2O_5$ to $Al_2O_3$ of parts (b) and (c) is about 1/1 to 4/1.

17. A composition as defined in claim 1 in which the mole ratio of $P_2O_5$ to $Al_2O_3$ in parts (b) and (c) is about 1/1 to 1/1.6.

18. A composition as defined in claim 1 in which the mole ratio of $P_2O_5$ to $Al_2O_3$ in parts (b) and (c) is about 1/1.

* * * * *

UNITED STATES PATENT AND TRADEMARK OFFICE
CERTIFICATE OF CORRECTION

PATENT NO. : 4,800,175
DATED : January 24, 1989
INVENTOR(S) : James E. Rapp

It is certified that error appears in the above-identified patent and that said Letters Patent is hereby corrected as shown below: Title page:

The Abstract should read as follows:

ABSTRACT

A doping composition for forming a doping source wafer for doping a silicon wafer with phosphorous for low temperature applications, the composition containing:

(a) 100 mesh or smaller particles of a polycrystalline ceramic having an average linear coefficient of thermal expansion of less than about 12 x $10^{-7}$/°C from zero to 300°C and consisting essentially of the following oxides in approximate mole percent:

| OXIDE | MOLE PERCENT |
|---|---|
| $P_2O_5$ | 45 - 75 |
| $Al_2O_3$ | 11 - 28 |
| $Ta_2O_5$ | 6.5 - 13 |
| $SiO_2$ | 0 - 20 |
| $La_2O_3$ | 0 - 7 | where $P_2O_5$ + $Al_2O_3$ + $Ta_2O_5$ is at least about 75 mole percent of the composition;

(b) $Al_2O_3$; and (c) $H_3PO_4$ in an aqueous solution for reaction with $Al_2O_3$ to form a binder for the ceramic particles.

Signed and Sealed this

Thirty-first Day of October, 1989

Attest:

DONALD J. QUIGG

*Attesting Officer*    *Commissioner of Patents and Trademarks*